United States Patent [19]

Funabashi et al.

[11] Patent Number: 4,794,583
[45] Date of Patent: Dec. 27, 1988

[54] DISK LOADER

[75] Inventors: Tadashi Funabashi; Toshihiko Kurihara, both of Saitama, Japan

[73] Assignee: Pioneer Electronic Corporation, Tokyo, Japan

[21] Appl. No.: 180,492

[22] Filed: Apr. 12, 1988

[30] Foreign Application Priority Data

Apr. 28, 1987 [JP] Japan .............................. 62-63414[U]

[51] Int. Cl.$^4$ ...................... G11B 17/04; G11B 25/04; G11B 1/00
[52] U.S. Cl. .................................................. 369/75.2
[58] Field of Search ....................................... 369/75.2

[56] References Cited

U.S. PATENT DOCUMENTS

| 4,564,930 | 1/1986 | Funabashi et al. | 369/75.2 |
|---|---|---|---|
| 4,627,037 | 12/1986 | Tanaru | 369/75.2 |
| 4,661,940 | 4/1987 | Camerik | 369/75.2 |
| 4,672,598 | 6/1987 | Koken et al. | 369/75.2 |
| 4,706,237 | 11/1987 | Nakayama | 369/75.2 |

Primary Examiner—Steven L. Stephan
Attorney, Agent, or Firm—Sughrue, Mion, Zinn, Macpeak & Seas

[57] ABSTRACT

A disk loader for a compact or video disk player with which the disks tray can be extended nearly completely out of the player for receiving a disk to be played without having to increase the overall depth of the player body. A pair of retainers are provided extending parallel to a direction of conveyance of the disk by the disk tray. Racks are formed in at least on one side of the disk tray and on an adjacent one of the retainers. A pair of fixedly mounted guide members guide each of the retainers. A first pinion is engaged with the rack on the retainer, while a gear is engaged with the rack on the tray, the gear being fixed to the first pinion and having a larger diameter than the first pinion. A second pinion is mounted on the output shaft of a drive motor and engaged with the gear.

2 Claims, 2 Drawing Sheets

DISK LOADER

BACKGROUND OF THE INVENTION

The present invention realates to a disk loader for a disk player for reproducing a digital audio disk such as a compact disk (CD), a video disk (LD) or the like and which functions to protrude a disk tray from the front of the disk player when a disk is to be loaded in the disk player and retracts the disk tray to a reproduction position when the disk is to be reproduced.

FIG. 1 shows a guide structure for the disk tray 3 of a conventional disk loader. The disk tray 3 conveys a disk 2 from a loading position to a reproduction position. The disk tray 3 has guide grooves 7 on the right and left sides of the tray. Each of the right and left attachment members 5 of a disk player 4 is provided with two guide rollers 6 fitted in a corresponding guide groove 7. The disk tray 3 is moved between the protruded loading position and the retracted reproduction position either manually or with an electrical drive or the like while being guided by the guide rollers 6 and the guide grooves 7.

When the disk tray 3 of the conventional disk loader is in the disk loading position, the disk tray must be stably supported by the guide rollers 6. To provide stable support, the length A of the protrusion of the disk tray 3, the depth D of the disk player 4, the distance L between the two guide rollers 6 on each side, and the diameter $\phi$ of each guide roller 6 are required to satisfy:

$$A \leq D - (L + \phi/2)$$

The longer the distance L, the more stably the disk tray 3 is supported. However, if the distance L between the two rollers 6 is increased, the length A of protrusion of the disk tray 3 is decreased, making it difficult to load the disk 2 on the disk tray. This is a drawback of the disk loader 3. If the length A of protrusion of the disk tray 3 is increased in order to make it easy to load the disk 2 on the disk tray, the depth D of the disk player 4 is increased, making it impossible to render the disk player 4 compact. This is another drawback of the disk loader 3.

SUMMARY OF THE INVENTION

The present invention was made in order to eliminate the above-mentioned drawbacks.

Accordingly, it is an object of the present invention to provide a disk loader with which loading a disk on a disk tray is facilitated by increasing the length of protrusion of the disk tray while simultaneously minimizing the depth of a disk player.

In the disk loader provided in accordance with the present device, the disk tray for conveying the disk and movable retainers for guiding the disk tray are provided with racks, with each of which a pinion and a gear which differ from each other in diameter are engaged to differentially move the disk tray and the retainers.

BRIEF DESCRIPTION OF THE INVENTION

DESCRIPTION OF THE PREFERRED EMBODIMENTS

Figure 1:
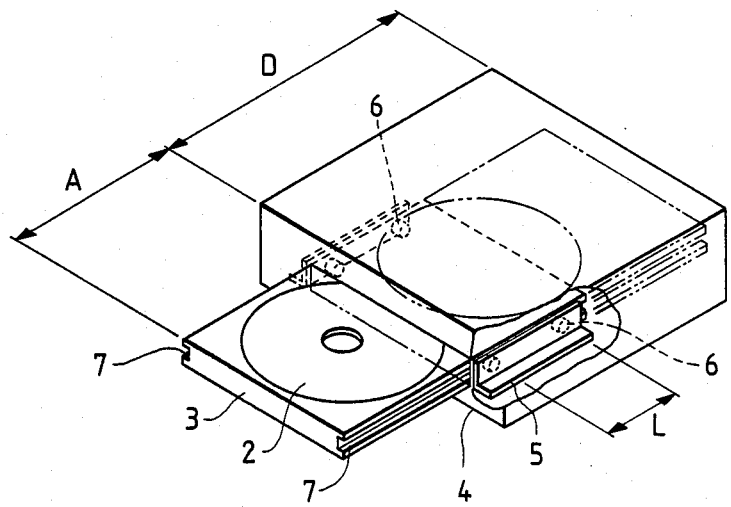
FIG. 1 is a perspective view of a conventional disk loader.

A preferred embodiment of the present invention will hereafter be described with reference to the attached drawings. Corresponding portions shown in the drawings are indicated by like reference numerals and characters.

Figure 2:
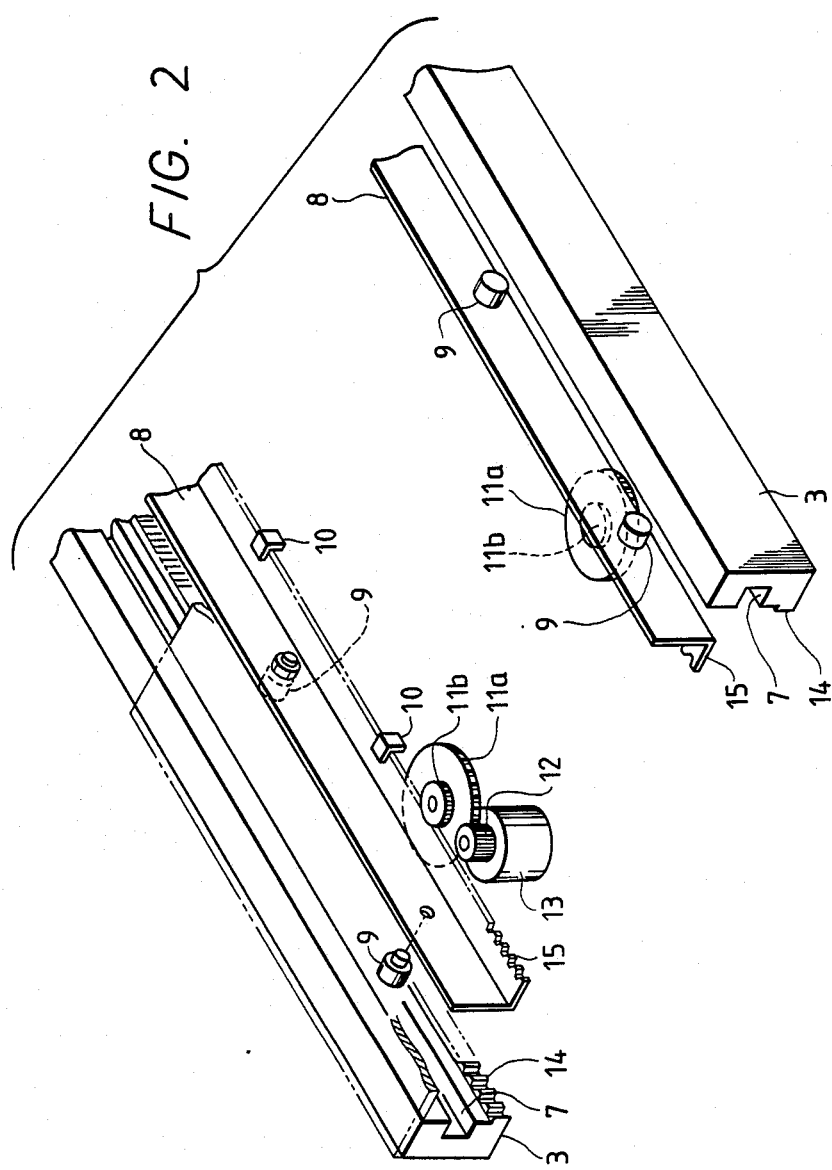
FIG. 2 is a perspective view of a primary portion of a disk loader constructed according to a preferred embodiment of the present invention.

FIG. 2 shows a disk loader constructed in accordance with a preferred embodiment of a disk loader of the invention. In this disk loader, a motor 13 is attached to a fixed member of a disk player and fitted with a pinion 12 engaged with a gear 11a having a large diameter. A pinion 11b, the number of teeth of which is equal to 1/n times the number of teeth on the gear 11a, is formed coaxially therewith. Two guide members 10 are provided on each of the right and left sides of the fixed member. Retainers 8 are supported by the guide members 10 at the right and left sides of the fixed member so that the retainers can be slid backward and forward. Two guide rollers 9 are attached to each of the retainers 8 and fitted in the guide grooves 7 of a disk tray 3 supported slidably backward and forward. Another gear 11a having a large diameter and another pinon 11b coaxial with the gear are provided opposite the motor 13. Racks 14 are provided in the disk tray 3 near the guide grooves 7 thereof and engaged with the gears 11a. Other racks 15 are provided in the retainers 8 and engaged with the pinions 11b.

When the motor 13 is rotated, the gear 11a and the pinion 11b are turned through the engagement of the pinion 12 and the gear so that the racks 14 and 15 are driven. As a result, the retainers 8 and the disk tray 3 are moved forward together while the retainers are guided by the guide members 10 and the disk tray is guided by the guide rollers 9 and the guide grooves 7. Since the number of teeth on the gear 11a is n times the number of teeth of the pinion 11b, the disk tray 3 is moved forward n times further than the retainers 8. The gear ratio of the gear 11a to the pinon 11b is determined so that the guide rollers 9 are moved out of the disk player when nearly all of the disk tray 3 is protruded from the disk player. The disk tray 3 is thus protruded from the disk player to such an extent that a disk can be easily loaded on the disk tray.

Figure 3:
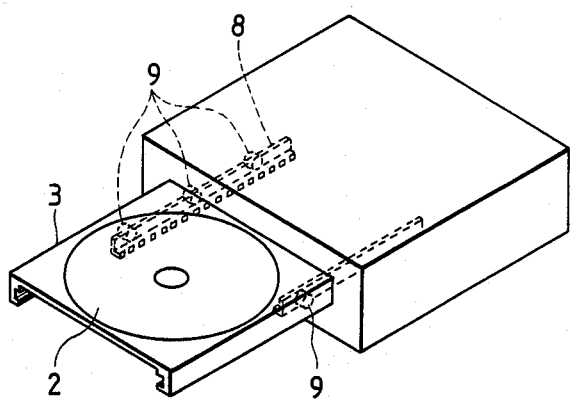
FIG. 3 is a perspective view of a disk loader constructed according to another embodiment of the present invention.

Although the two guide rollers 9 are provided at each of the right and left sides of the disk tray 3 in the abovedescribed embodiment, the present invention is not limited to this particular arrangement and otherwise may be embodied with each driving side provided with only one guide roller, as shown in FIG. 3.

The present invention can be applied to any of a compact disk player, a video disk player and a player capable of playing both a compact disk and a video disk.

Although the disk tray 3 is supported by the retainers through the guide rollers 9 in the above-described embodiment, the present invention is not limited thereto. For example, the disk tray may be supported by the retainers through the engagement of V-grooves, the engagement of grooves of semicircular section, or the like.

According to the present device, retainers provided with guide members supporting a disk tray are moved in differential conjunction with the disk tray by a gear mechanism so that almost all of the disk tray can be protruded from the disk player. For that reason, a disk can be easily loaded on the disk tray, although the depth of the disk player is not increased. As a result, the depth of the disk player and the distance of protrusion of the disk tray can be made nearly equal to each other so that the depth of the disk player can be made nearly equal to the diameter of the disk to thus allow the disk player to be built in a so-called "jacket" size. The disk player can thus be made compact.

What is claimed is:

1. A disk loader comprising: a disk tray for holding and conveying a disk between an extended loading position and a playing position; a pair of retainers extending parallel to a direction of conveyance of said disk by said disk tray, racks being formed in at least on one side of said disk tray and on an adjacent one of said retainers; a pair of rollers fixed to each of said retainers and having rotatable roller portions received in a guide groove formed in a respective one of said sides of said disk tray; at least a pair of fixedly mounted guide members for guiding each of said retainers; a first pinion engaged with said rack on said retainer; a gear engaged with said rack on said tray, said gear being fixed to said first pinion; a drive motor; and a second pinion mounted on an output shaft of said motor and engaged with said gear, said gear having a larger diameter than said first and second pinions.

2. The disk loader of claim 1, wherein racks are formed in both sides of said disk tray and on both of said retainers, and wherein one each of said first and second pinions and gear is provided for each side of said tray.

* * * * *